(12) United States Patent
Chang et al.

(10) Patent No.: US 10,467,169 B2
(45) Date of Patent: Nov. 5, 2019

(54) HUMAN INTERFACE DEVICE SWITCH WITH SECURITY FUNCTION

(71) Applicant: I/O INTERCONNECT, LTD., Santa Ana, CA (US)

(72) Inventors: Chih-Hsiung Chang, Taipei (TW); Kun-Yuan Lin, Taipei (TW)

(73) Assignee: I/O INTERCONNECT, LTD., Santa Ana, CA (US)

( * ) Notice: Subject to any disclaimer, the term of this patent is extended or adjusted under 35 U.S.C. 154(b) by 97 days.

(21) Appl. No.: 15/726,794

(22) Filed: Oct. 6, 2017

(65) Prior Publication Data
US 2018/0101496 A1 Apr. 12, 2018

Related U.S. Application Data

(60) Provisional application No. 62/429,167, filed on Dec. 2, 2016, provisional application No. 62/406,498, filed on Oct. 11, 2016.

(51) Int. Cl.
| | |
|---|---|
| *G06F 13/40* | (2006.01) |
| *G06F 13/10* | (2006.01) |
| *G06F 3/038* | (2013.01) |

(52) U.S. Cl.
CPC .......... *G06F 13/4022* (2013.01); *G06F 3/038* (2013.01); *G06F 13/105* (2013.01); *G06F 13/4068* (2013.01); *G09G 2370/24* (2013.01)

(58) Field of Classification Search
None
See application file for complete search history.

(56) References Cited

U.S. PATENT DOCUMENTS

| | | |
|---|---|---|
| 6,160,544 A | 12/2000 | Hayashi et al. |
| 6,324,605 B1 | 11/2001 | Rafferty et al. |

(Continued)

FOREIGN PATENT DOCUMENTS

| | | | | |
|---|---|---|---|---|
| CN | 201966949 U | * | 9/2011 | |
| EP | 2306360 A1 | * | 4/2011 | ............ G06F 3/023 |

(Continued)

OTHER PUBLICATIONS

'K2016E-SH-16-Port DVI Secure EAL4+ KVM Switch with CAC & Audio' from KVM Switches Online, archived on Sep. 26, 2016. (Year: 2016).*

(Continued)

*Primary Examiner* — Steven G Snyder
(74) *Attorney, Agent, or Firm* — Locke Lord LLP; Tim Tingkang Xia, Esq.

(57) ABSTRACT

Present disclosure relates to a HID switch with security function that permits sharing of peripherals between multiple computers in a multi-network computer system. The HID switch is configured to connect at least one user input peripheral device and at least two host computers. The HID switch incudes a first directing module and a second directing module, wherein the two directing modules are physically isolated. The passages directed to the two directing modules are controlled by a physical peripheral selector. The physical peripheral selector is configured to selectively enable the first passage and the second passage, wherein only one of the first and second passages is enabled at a time. When one of the first or the second passages is enabled, there is only one host computer is electrically connected to the user input peripheral device via one of the directing modules.

3 Claims, 9 Drawing Sheets

(56) References Cited

U.S. PATENT DOCUMENTS

| | | | |
|---|---|---|---|
| 6,549,966 B1 * | 4/2003 | Dickens | G06F 13/4022 370/406 |
| 6,557,170 B1 * | 4/2003 | Wilder | G06F 1/266 345/168 |
| 6,618,774 B1 * | 9/2003 | Dickens | G06F 13/385 174/19 |
| 6,671,756 B1 | 12/2003 | Thomas et al. | |
| 6,681,250 B1 | 1/2004 | Thomas et al. | |
| 7,689,724 B1 * | 3/2010 | Hatton | G06F 13/105 709/253 |
| 7,873,764 B2 | 1/2011 | Bica | |
| 7,945,703 B2 | 5/2011 | Sim et al. | |
| 8,589,141 B2 * | 11/2013 | Lien | G06F 3/038 703/23 |
| 8,769,172 B2 * | 7/2014 | Soffer | G06F 3/023 710/64 |
| 8,869,308 B2 * | 10/2014 | Soffer | G06F 3/0227 726/34 |
| 9,411,766 B2 * | 8/2016 | Soffer | G06F 3/0227 |
| 9,501,157 B2 * | 11/2016 | Soffer | G06F 3/023 |
| 9,542,006 B2 * | 1/2017 | Soffer | G06F 21/83 |
| 9,665,525 B2 * | 5/2017 | Soffer | G06F 13/4221 |
| 9,767,049 B2 * | 9/2017 | Soffer | G06F 3/023 |
| 2004/0015615 A1 | 1/2004 | Liu | |
| 2005/0044266 A1 * | 2/2005 | O'Neil | G06F 3/023 709/238 |
| 2005/0216620 A1 | 9/2005 | Sandulescu et al. | |
| 2005/0235079 A1 * | 10/2005 | Chen | G06F 3/0227 710/73 |
| 2007/0247430 A1 * | 10/2007 | Huang | G06F 3/038 345/168 |
| 2009/0031049 A1 * | 1/2009 | Lien | G06F 3/023 710/6 |
| 2009/0083453 A1 * | 3/2009 | Hsueh | G06F 3/023 710/36 |
| 2009/0204742 A1 | 8/2009 | Wiler | |
| 2010/0023660 A1 * | 1/2010 | Liu | G06F 3/023 710/71 |
| 2010/0228884 A1 | 9/2010 | Sim et al. | |
| 2011/0145451 A1 * | 6/2011 | Soffer | G06F 3/023 710/64 |
| 2011/0208963 A1 * | 8/2011 | Soffer | G06F 3/023 713/168 |
| 2012/0159651 A1 * | 6/2012 | Beacham | G06F 3/023 726/34 |
| 2013/0050084 A1 * | 2/2013 | Soffer | G06F 3/023 345/163 |
| 2013/0067534 A1 * | 3/2013 | Soffer | G06F 3/0227 726/2 |
| 2014/0019652 A1 * | 1/2014 | Soffer | G06F 21/83 710/73 |
| 2014/0172422 A1 * | 6/2014 | Hefetz | G10L 19/00 704/229 |
| 2014/0244880 A1 * | 8/2014 | Soffer | G06F 3/0227 710/300 |
| 2014/0289433 A1 | 9/2014 | Soffer et al. | |
| 2015/0356045 A1 * | 12/2015 | Soffer | G06F 13/4221 710/303 |
| 2015/0365237 A1 * | 12/2015 | Soffer | G06F 21/85 726/20 |
| 2018/0097629 A1 * | 4/2018 | Soffer | G06F 21/85 |
| 2018/0189197 A1 * | 7/2018 | Lin | G06F 13/105 |

FOREIGN PATENT DOCUMENTS

| | | | | |
|---|---|---|---|---|
| EP | 2476076 B1 * | 4/2015 | | G06F 3/023 |
| EP | 3318960 A1 * | 5/2018 | | G06F 3/038 |
| TW | 201407356 A | 2/2014 | | |
| WO | WO-2005008409 A2 * | 1/2005 | | G06F 3/023 |
| WO | WO-2011030126 A1 * | 3/2011 | | G06F 3/023 |
| WO | 2011104715 A2 | 9/2011 | | |
| WO | WO-2011104715 A3 * | 1/2012 | | G06F 3/023 |

OTHER PUBLICATIONS

'The Ultimate Secure KVM Solution' by HighSecLabs, copyright 2014. (Year: 2014).*

* cited by examiner

HUMAN INTERFACE DEVICE SWITCH WITH SECURITY FUNCTION

CROSS-REFERENCE TO RELATED APPLICATION

This application claims priority to U.S. Provisional application Ser. No. 62/406,498, filed on Oct. 11, 2016, and U.S. Provisional application Ser. No. 62/429,167, filed on Dec. 2, 2016, the disclosures of which are incorporated by reference herein.

BACKGROUND

Field of Invention

Present disclosure relates to a human interface switch. More particularly, present disclosure relates to a human interface switch with security function.

Description of Related Art

Human interface device (HID) switches, such as KVM switch (Keyboard Video Mouse switch), are used for interconnecting a single human interface device to multiple computers for control purposes. The KVM switch may control a human interface device to send commands to one of the computers and retrieve information therefrom, thus a user of the human interface device may remotely access to these computers from a single keyboard, a monitor, and a mouse. During accessing these computers, typing on keyboard or pointing with mouse may generate data correspondingly, and the data are sent to one of the computers via the switch. In the other end, the computer may send video data to a video monitor via the switch as well. In general, the user may navigate through an on-screen menu or display to switch between these connected computers.

Some KVM switches allow the user to view and access one of the connected computers; however, at the same time, the user may view video images from the other non-accessed computers on parts of the user's video screen. The approach provides enables the user to acquire information from different computers simultaneously, and makes navigation between the computers more convenient and faster. However, though said prior arts is convenient for making a single human interface device may receive information from several computers simultaneously, but these prior arts do not concern about protecting information from passing through the switch, which make cause information leakage between these connected computers. Although these computers are located in different places, through the KVM switch, these computers are not actually isolated.

For many applications (such as transactions in banking markets) it is desirable to have a secured management device which may control multiple computers in a simple way but meanwhile prevent information leakage between these computers.

The present disclosure addresses an aspect for providing a HID switch with a truly isolated combiner. As such, the HID switch may achieve a higher level of security.

SUMMARY

Present disclosure provides a HID (Human Interface Device) switch with security function that permits sharing of peripherals between multiple computers in a multi-network computer system. The HID switch comprises an input interface and an output interface. The input interface is configured to connect to a user input peripheral device. The output interface is configured to connect to a user output peripheral device via a decoder. The HID switch comprises a first peripheral interface and a second peripheral interface, wherein both the first and second peripheral interface are configured to connect to a first host computer and a second host computer, respectively, wherein the first host computer and the second host computer are capable of being connected to at least two separate networks, respectively. The HID switch comprises a controller connected to the input interface and the output interface, wherein the controller is configured to input peripheral data via a bidirectional port from the user input peripheral device and generate single unidirectional serial output signals according to the peripheral data. The HID switch further comprises a first peripheral emulator and a second peripheral emulator, each of the peripheral emulators is connected to one of the first and second peripheral interfaces, respectively, wherein the first and second peripheral emulators receive information in the single unidirectional serial output signals and exchange bidirectional information with the first and second host computers. The HID switch further comprises a first encoder and a second encoder, wherein both the encoders are configured to connect to the first host computer and the second host computer, respectively, wherein the first and second encoders receive host output signals from the first and second host computer, respectively, and transform the host output signals to coded signals. The HID switch further comprises a first directing module and a second directing module, wherein the first directing module is connected to the first peripheral emulator and the first encoder via a first passage, wherein the second directing module is connected to the second peripheral emulator and the second encoder via a second passage. The first directing module comprises a first input physical unidirectional enforcing circuit and a first output physical unidirectional enforcing circuit. The first input physical unidirectional enforcing circuit is connected between the first peripheral emulator and the controller, enforcing unidirectional data flow only from the controller to the first peripheral emulator. The first output physical unidirectional enforcing circuit, connected between the first encoder and the controller, enforcing unidirectional data flow only from the first encoder to the controller. The second directing module comprises a second input physical unidirectional enforcing circuit and a second output physical unidirectional enforcing circuit. The second input physical unidirectional enforcing circuit is connected between the second peripheral emulator and the controller, enforcing unidirectional data flow only from the controller to the second peripheral emulator. The second output physical unidirectional enforcing circuit is connected between the second encoder and the controller, enforcing unidirectional data flow only from the second encoder to the controller. The HID switch further comprises a physical peripheral selector. The physical peripheral selector is configured to selectively enable the first passage and second passage, wherein only one of the first and second passages is enabled at a time. When the first passage is enabled, information in the unidirectional serial output signals from controller is directed to the first peripheral emulator, and the coded signals from the first encoder is directed to the decoder via the controller and sent to the user output peripheral device. When the second passage is enabled, information in the unidirectional serial output signals from the controller is directed to the second peripheral emulator, and the coded signals from the second encoder is directed to the decoder via the controller and sent to the user output peripheral device.

Another aspect of present disclosure is providing a HID switch with security function that permits sharing of peripherals between multiple computers in a multi-network computer system. The HID switch comprises an interface, configured to connect to a user input peripheral device. The HID switch further comprises a first peripheral emulator and a second peripheral emulator. The first and second peripheral emulators are both configured to connect to a first host computer and a second host computer, respectively, wherein the first and second host computer are capable of being connected to at least two separate networks, respectively, wherein the first peripheral emulator comprises a first memory stored with first addressing data, and the second peripheral emulator comprises a second memory stored with second addressing data, wherein the first addressing data is different from the second addressing data. The HID switch further comprises a controller. The controller is connected to the user input peripheral device through said coupling port, to input peripheral data via a bidirectional port and generate single unidirectional serial output signals according to the peripheral data. The HID switch further comprises a first addressing logic data latch and a second addressing logic data latch. Both the first and second addressing logic data latches are connected to the controller to receive the unidirectional serial output signals broadcasted from the controller. The HID switch further comprises an encryption unit. The encryption unit is connected to the controller, the first addressing logic latch and the second addressing logic latch, wherein the encryption unit provide an encryption command to the controller so that the controller encrypts the unidirectional serial output signals according to the encryption command, wherein the encryption command includes one of the first addressing data or the second addressing data at a time, wherein the encryption unit controls the first addressing logic latch and the second addressing logic latch. The HID switch further comprises a first physical unidirectional enforcing circuit and a second physical unidirectional enforcing circuit. The first physical unidirectional enforcing circuit is connected between the first addressing logic latch and the first peripheral emulator, enforcing unidirectional data flow only from the first addressing logic latch to the first peripheral emulator. The second physical unidirectional enforcing circuit is connected between the second addressing logic latch and the second peripheral emulator, enforcing unidirectional data flow only from the second addressing logic latch to the second peripheral emulator. The first and second device emulators are electrically isolated from one another, wherein when the first peripheral emulator receives the unidirectional serial output signals, the first peripheral emulator decrypts the unidirectional serial output signal according to the first addressing data and send the unidirectional serial output signals to the first host computer, and wherein when the second peripheral emulator receives the unidirectional serial output signals, the second peripheral emulator decrypts the unidirectional serial output signal according to the second addressing data and send the unidirectional serial output signals to the second host computer.

Another aspect of present disclosure is providing a HID switch with security function that permits sharing of peripherals between multiple computers in a multi-network computer system. The HID switch comprises a first interface and a second interface. The first interface is configured to connect to a user peripheral device. The second interface is configured to connect to an administrator device. The HID switch further comprises a first peripheral emulator and a second peripheral emulator, both the first and second peripheral emulators are configured to connect to a first host computer and a second host computer, respectively, wherein the first and second host computer are capable of being connected to at least two separate networks, respectively. The first and second peripheral emulators are further connected to the administrator device through the second interface respectively, and wherein the administrator device provides a regulation to limit that each of the first and second peripheral emulators is only allowed to receive signals from one type of user peripheral devices, respectively, wherein the first and second peripheral emulators receive information in the unidirectional serial output signals and exchange bidirectional information with the first and second host computers. The HID switch further comprises a controller connected to the user peripheral device through the first interface, wherein the controller is configured to input peripheral data via a bidirectional port and generate unidirectional serial output signals according to the peripheral data. Wherein the first and second peripheral emulators are physically isolated from one another, wherein when the first peripheral emulator or the second peripheral emulator receives the unidirectional serial output signals from the controller, the first peripheral emulator or the second peripheral emulator determines if it is allowable to receive the unidirectional serial output signals according to a type of the user peripheral device.

Another aspect of present disclosure is providing a HID switch with security function that permits sharing of peripherals between multiple computers in a multi-network computer system. The HID switch comprises a first interface and a second interface. The first interface is configured to connect to a user peripheral device. The second interface is configured to connect to an administrator device. The HID switch further comprises a first peripheral emulator and a second peripheral emulator, both configured to connect to a first host computer and a second host computer, respectively, wherein the first and second host computer are capable of being connected to at least two separate networks, respectively, and wherein the first and second peripheral emulators receive information in the unidirectional serial output signals and exchange bidirectional information with the first and second host computers, wherein each of the first and second peripheral emulators is routed by a unique address, respectively. The HID switch further comprises a controller connected to the user peripheral device through the first interface, wherein the controller is configured to input peripheral data via a bidirectional port and generate unidirectional serial output signals according to the peripheral data, and wherein the controller is connected to the administrator device through the second interface, wherein the administrator device provides a regulation to limit the controller to add address information to the unidirectional serial output signals. Wherein the first and second peripheral emulators are physically isolated from one another, wherein when the first peripheral emulator or the second peripheral emulator receives the unidirectional serial output signals, the first peripheral emulator or the second peripheral emulator determines whether to receive the unidirectional serial output signals by comparing the address information with the unique address.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
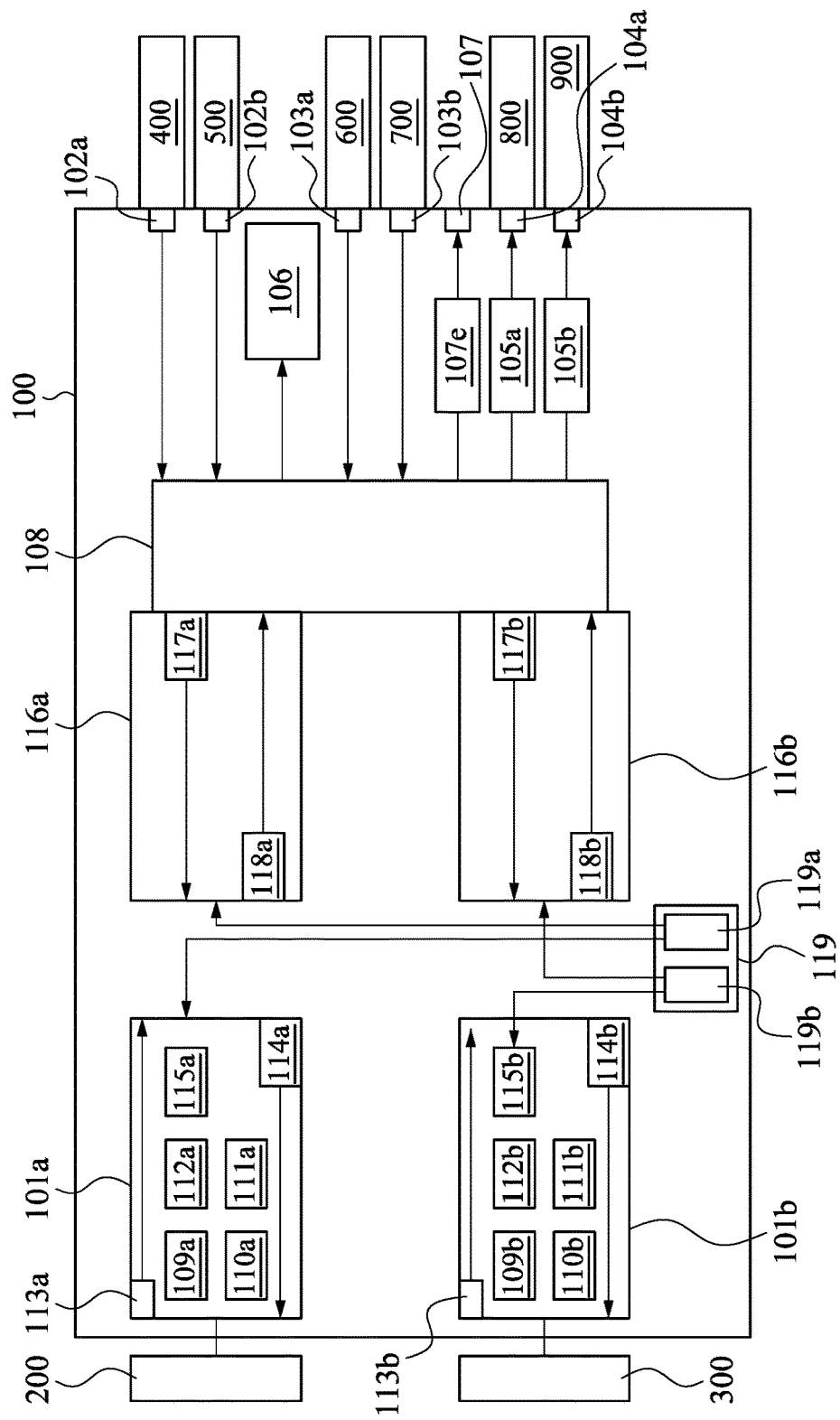
FIG. 1 is a schematic diagram of a HID switch with security function according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

FIG. 1 is a schematic diagram of a HID switch with security function according to some embodiment of the present disclosure. As shown in FIG. 1, the HID switch 100 is utilized to interconnect several human interface devices and multiple host devices. In the embodiment, the HID switch 100 provides two sets of coupling ports, which are a first peripheral coupling module 101a and a second peripheral coupling module 101b. The first peripheral coupling module 101a is in connection with a first host computer 200, and the second peripheral coupling module 101b is in connection with a second host computer 300. The first host computer 200 and the second host computer 300 are, for example, personal computers, servers, workstations or other active devices with computation function.

In the embodiment, the HID switch 100 also provides host coupling ports to connect to some human interface devices. As shown in FIG. 1, in the embodiment, the HID switch 100 comprises a first USB port 102a and a second USB port 102b. The first USB port 102a and the second USB port 102b are configured to electrically couple to a keyboard 400 and a mouse 500, respectively. The third USB port 102c is configured to electrically couple to a fingerprint scanner or other identifying device (not shown in Figure). In the embodiment, the HID switch 100 also comprises a first PS/2 port 103a and a second PS/2 port 103b, wherein the first PS/2 port 103a and the second PS/2 port 103b are configured to electrically couple to a keyboard 600 and a mouse 700, respectively. The HID switch 100 comprises a first DVI-D port 104a and a second DVI-D port 104b, wherein the first DVI-D port 104a and the second DVI-D port 104b are configured to electrically couple to a first monitor 800 and a second monitor 900, respectively. The first DVI-D port 104a is connected to a first DVI switch 105a, and the second DVI-D port 104a is connected to a second DVI switch 105b. Through the first DVI switch 105a and the second DVI switch 105b, coded video signals may be decoded and separately sent to the first monitor 800, second monitor 900 or other display devices coupled to the first DVI-D port 104a or the second DVI-D port 104b.

In addition, the HID switch 100 also provides an audio output port 106. The audio output port 106 includes a decoder (not shown), when coded audio signals passed from a IIS (Integrated Inter-chip Sound) line (not shown) to the audio output port 106, the coded audio signals may be decoded and sent to an audio output device (not shown in figure). In the embodiment, the HID switch 100 further includes a third USB port 107, wherein the third USB port 107 is connected to a CAC (Carrier Access Codes) channel 107e. The CAC channel 107e provides identification function that user may get authorization for using some software by an IC card reader, fingerprint scanner or other identifying device connected to the third USB port 107. The human interface device, the audio output device and the video output device mentioned above are controlled by a controller 108. The controller 108 includes at least one emulator (not shown) to emulate as a standard peripheral device, such as USB or PS/2 keyboard or mouse. The emulators are configured to input peripheral data from the abovementioned input device, such as keyboard 400, mouse 500, keyboard 600 and mouse 700, via a bidirectional port, such as the first USB port 102a, the second USB port 102b, the first PS/2 port 103a and the second PS/2 port 103b. The emulators are configured to generate single unidirectional serial output signals according to the peripheral data from the abovementioned input device.

As described above, the HID switch 100 includes the first peripheral coupling module 101a and the second peripheral coupling module 101b, which are separately connected with the first host computer 200 and the second host computer 300. Each of the peripheral coupling modules is basically same as one another. The first peripheral coupling module 101a comprises several parts, and these parts will be described in detail as follows. A first coupling port 109*a* is a bidirectional port, physically coupled to the first host computer 200. A first audio input port 110*a* is electrically coupled to the first host computer 200 to receive audio data. A first audio encoder 111*a* is electrically coupled to the first audio input port 110*a*, configured to encode the received audio data. A first peripheral emulator 112*a* is configured to receive the single unidirectional serial output signals passed from the controller 108 and exchange bidirectional information with the first host computer 200 via the first coupling port 109*a*. A first video line 113*a* is configured to receive video data from the first host computer 200, wherein format of the video data steam is, for example but not limit to, DVI. A first CAC port 114*a* is electrically coupled to the first host computer 200 to receive or transmit identification data. The first CAC port 114*a* is in connection with a USB software unit (not shown), wherein the USB software unit is configured to manage the identification data.

In the embodiment, the structure of the second peripheral coupling module 101*b* is basically corresponding to the first peripheral coupling module 101*a*. The second peripheral coupling module 101*b* comprises a second coupling port 109*b*, a second audio input port 110*b*, a second audio encoder 111*b*, a second peripheral emulator 112*b*, a second video line 113*b* and a second CAC port 114*b*. The function of these units and the connection between these units may be referenced to abovementioned description.

In the embodiment, the first peripheral coupling module 101*a* includes a first physical switch 115*a*, wherein the first physical switch 115*a* of the first peripheral coupling module 101*a* is electrically coupled to the controller 108 via a first directing module 116*a*, and the first physical switch 115*a* is connected to the first directing module 116*a* through a first network passage. The first directing module 116*a* includes two pathways for transmitting signals between the controller 108 and the first peripheral coupling module 101*a*, and each pathway is physically isolated from another. One pathway is a first input physical unidirectional enforcing circuit 117*a*, wherein the first input physical unidirectional enforcing circuit 117*a* is configured to enforce unidirectional data flow only from the controller 108 to the first peripheral emulator 112*a*. Another pathway is a first output physical unidirectional enforcing circuit 118*a*, wherein the first output physical unidirectional enforcing circuit 118*a* is configured to enforce unidirectional data flow only from the first audio encoder 111*a* and the first video line 113*a* to the controller 108. These two pathways are isolated. The first input physical unidirectional enforcing circuit 117*a* and the first output physical unidirectional enforcing circuit 118*a* are, for example, optical-isolator, serial link, electromagnetic coupler, transformer or any other suitable circuitry assuring that data may only flows along a predetermined direction.

In the embodiment, the second peripheral coupling module 101*b* also includes a second physical switch 115*b*. The second physical switch 115*b* is electrically coupled to the controller 108 via a second directing module 116*b*, and the second physical switch 115*b* is connected to the second directing module 116*b* through a second network passage. The second network passage is physically isolated from the first network passage connected between the first physical switch 115*a* and the first directing module 116*a*. The second directing module 116*b* also includes two pathways for transmitting signals between the controller 108 and the second peripheral coupling module 101*b*, and each pathway is physically isolated from another. One pathway is a second input physical unidirectional enforcing circuit 117*b*, wherein the second input physical unidirectional enforcing circuit 117*b* is configured to enforce unidirectional data flow only from the controller 108 to the second peripheral emulator 112*b*. Another pathway is a second output physical unidirectional enforcing circuit 118*b*, wherein the second output physical unidirectional enforcing circuit 118*b* is configured to enforce unidirectional data flow only from the second audio encoder 111*b* and the first video line 113*b* to the controller 108. These two pathways are isolated. The second input physical unidirectional enforcing circuit 117*b* and the second output physical unidirectional enforcing circuit 118*b* are, for example, optical-isolator, serial link, electromagnetic coupler, transformer or any other suitable circuitry assuring that data may only flows along a predetermined direction.

In the embodiment, the first physical switch 115*a* is actuated by a first button 119*a* configured to manage the first network passage. Whenever the first button 119*a* is pressed, the first peripheral coupling module 101*a* is electrically coupled to the first directing module 116*a* via the first network passage so that the data stream from the first host computer 200 may be linked to the controller 108. In order to isolate the input and output data stream and to prevent information leakage, the data stream flows from the first host computer 200 is enforced by the first output physical unidirectional enforcing circuit 118*a*, and the data stream flows from the HID devices, such as the keyboard 400 or the mouse 500, is enforced by the first input physical unidirectional enforcing circuit 117*a*. In the same manner, the second physical switch 115*b* is actuated by a second button 119*b* configured to manage the second network passage. Whenever the second button 119*b* is pressed, the second peripheral coupling module 101*b* is electrically coupled to the second directing module 116*b* via the second network passage so that the data stream from the second host computer 300 may be linked to the controller 108. In order to isolate the input and output data stream and to prevent information leakage, the data stream flows from the second host computer 300 is enforced by the second output physical unidirectional enforcing circuit 118*b*, and the data stream flows from the HID devices, such as the keyboard 400 or the mouse 500, is enforced by the second input physical unidirectional enforcing circuit 117*b*.

Moreover, in the embodiment, the first button 119*a* and the second button 119*b* are configured in a selector module 119. The selector module 119 is a physical switch that only enables one of the buttons, which are the first button 119*a* or the second button 119*b*, is actuated at a time. Because the first button 119*a* and the second button 119*b* are both physical components, and the first and second network passages are two isolated passages, the data steam cannot be linked between any two hosts. Furthermore, the first input physical unidirectional enforcing circuit 117*a* and the second input physical unidirectional enforcing circuit 117*b* are applied with USB data lines, the USB peripheral devices cannot retrieve or record any data from the host computers 200 and 300. The first output physical unidirectional enforcing circuit 118*a* and the second output physical unidirectional enforcing circuit 118*b* are applied with IIS data lines so that the IIS data stream cannot be linked between the host computers 200 and 300. Accordingly, the data of the hosts is isolated from each other and the information leakage is prevented.

However, it should be understood that the aforementioned embodiment is only an exemplary embodiment, more than two host computers are available to be applied to the HID switch 100. When more than two host computers are applied to the HID switch 100, the number of the physical unidirectional enforcing circuits and the network passages may be applied accordingly, so does the buttons configured to manage the network passages.

Figure 2:
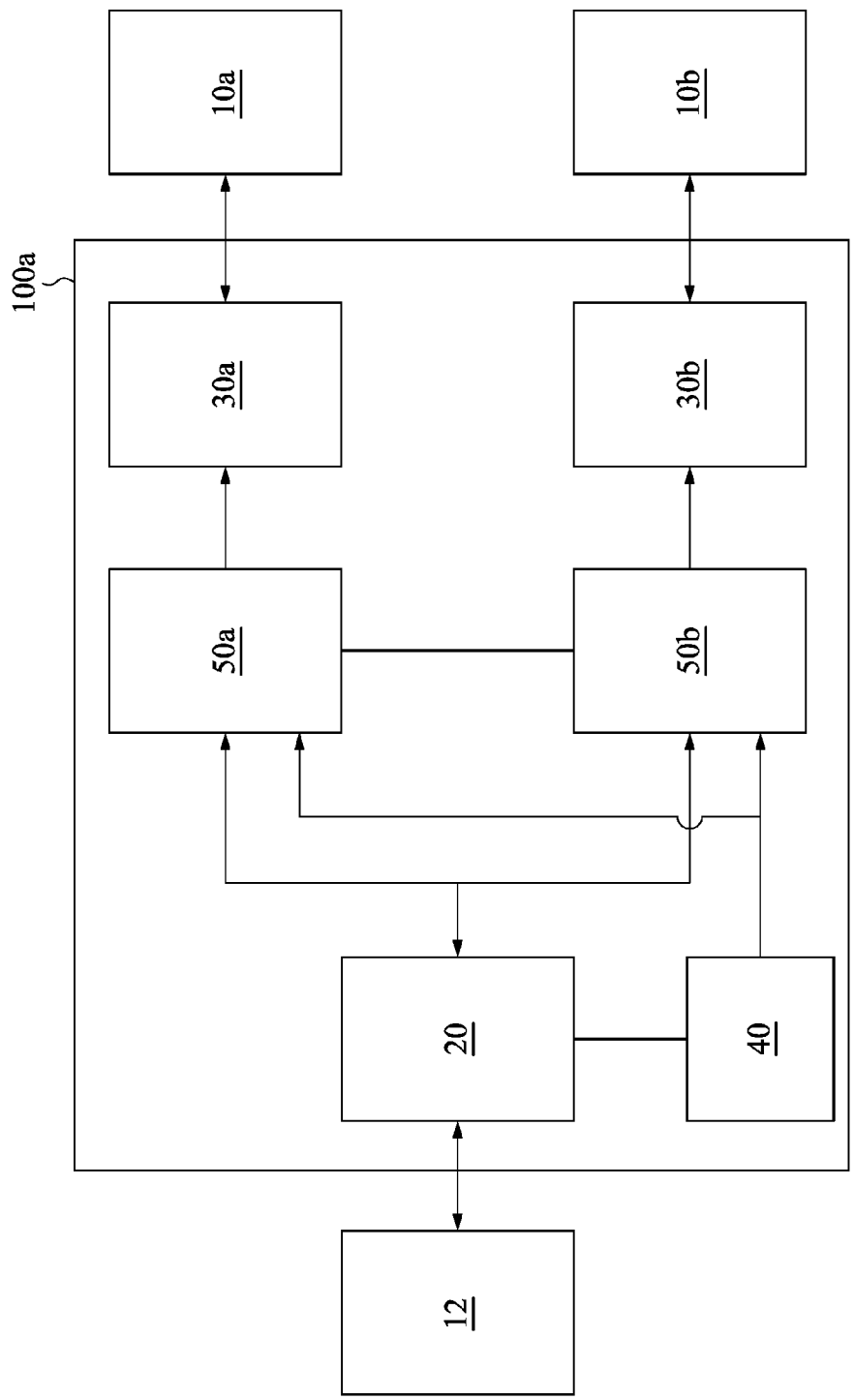
FIG. 2 is a schematic diagram of a HID switch with security function according to some embodiments of the present disclosure.

Reference is now made to FIG. 2. FIG. 2 is a schematic diagram of a HID switch with security function according to some embodiment of the present disclosure. As shown in FIG. 2, the HID switch 100a is utilized to interconnect human interface devices (HIDs) and multiple host devices. In the embodiment, the HID switch 100a provides two sets of peripheral interfaces so that the HID switch 100a may connect to a first host computer 10a and a second host computer 10b, respectively. The first host computer 10a and the second host computer 10b are, for example, personal computers, servers, workstations or other active devices with computation function. On the other end, the HID switch 100a also provides a host interface to connect to at least one HID device 12. For example, the host interface of the HID switch 100a may include some input ports, such as USB ports or PS/2 ports. In some embodiments, if the host interface is an USB port, it is configured to electrically couple to a USB keyboard or a USB mouse. Similarly, if the host interface is a PS/2 port, it is configured to electrically couple to a PS/2 keyboard or a PS/2 mouse.

In some embodiments, the host interface of the HID switch 100a may also include some output ports, such as DVI-D ports, video output ports or audio output ports. If the host interface is a DVI-D port, it is configured to electrically couple to a monitor with DVI-D interface. The host interface of the HID switch 100a is not limited to DVI-D ports, the other standard video ports, such as, HDMI ports, DP ports, VGA ports, DVI-A ports, S-video ports, mini DVI ports, micro DIV port, ADC ports, composite video ports, thunderbolt ports or USB type C ports are also possible. Moreover, the video output device coupled through the audio output port is not limited to a monitor, a projector or other video display devices are also available. In addition to the I/O devices mentioned above, the HID switch 100a may be electrically coupled to other I/O devices via the host interface, for example, a touch pad, a writing board, a light pen and so on. It is to say, HID device 12 shown in FIG. 1 may be one of the I/O devices, video display devices and audio devices mentioned above.

As shown in FIG. 2, HID host emulator 20 is electrically coupled to HID device 12. The HID device 12 may exchange bi-directional information with the HID host emulator 20 as shown by the bi-directional arrow. On the other end, a first HID device emulator 30a and a second device emulator 30b are electrically coupled to the first host computers 10a and the second host computer 10b, respectively. Similarly, the first HID device emulator 30a and the second HID device emulator 30b are configured to exchange bi-directional information with the first host computers 10a and the second host computer 10b. A HID isolation unit 50a is electrically coupled between the HID host emulator 20 and the first HID device emulator 30a. A HID isolation unit 50b is electrically coupled between the HID host emulator 20 and the second HID device emulator 30b. In the embodiment, an encryption unit 40 is electrically coupled to the HID host emulator 20, and each of the first HID isolation unit 50a and the second HID isolation unit 50b, respectively. The encryption unit 40 is utilized to control HID data encryption in the HID host emulator 20, and to control HID data decryption in the first HID isolation unit 50a and the second HID isolation unit 50b.

When HID host emulator 20 receives HID data input from HID device 12, HID host emulator 20 may encrypt the HID data according to the command from the encryption unit 40, and transforms the encrypted HID data under a specific protocol. The encrypted HID data may then be broadcast to the first HID isolation units 50a and the second HID isolation unit 50b. The data latches in the first HID isolation units 50a and the second HOD isolation unit 50b are controlled by the encryption unit 40. For example, when the first host computer 10a is being selected to be connected to the HID device 12, the encryption unit 40 may enable the data latch in the first HID isolation unit 50a. Then, the first HID device emulator 30a may receive the encrypted HID data through from the first HID isolation unit 50a and may decrypt the encrypted HID data correctly. The decrypted HID data may then be sent to the first host computer 10a. On the contrary, the data latch in the second HID isolation unit 50b is not enabled by the encryption unit 40 so that the second HID device emulator 30b may not receive the HID data from the second HID isolation unit 50b. For information security, the first HID isolation unit 50a and the second HID isolation unit 50b may contain unidirectional components (not shown in the figure), for example, optical-isolator, serial link, electromagnetic coupler, transformer or any other suitable circuitry which only enable data to flow along a single direction. Accordingly, HID data flow may only flow from the HID host emulator 20 to the first HID device emulator 30a or the second HID device emulator 30b. In addition, the encryption unit 40 may transmit the decryption information to the selected HID device emulator, which may be the first HID device emulator 30a or the second HID device emulator 30b, so that the encrypted HID data may be decrypted correctly on one HID device emulator.

Figure 3:
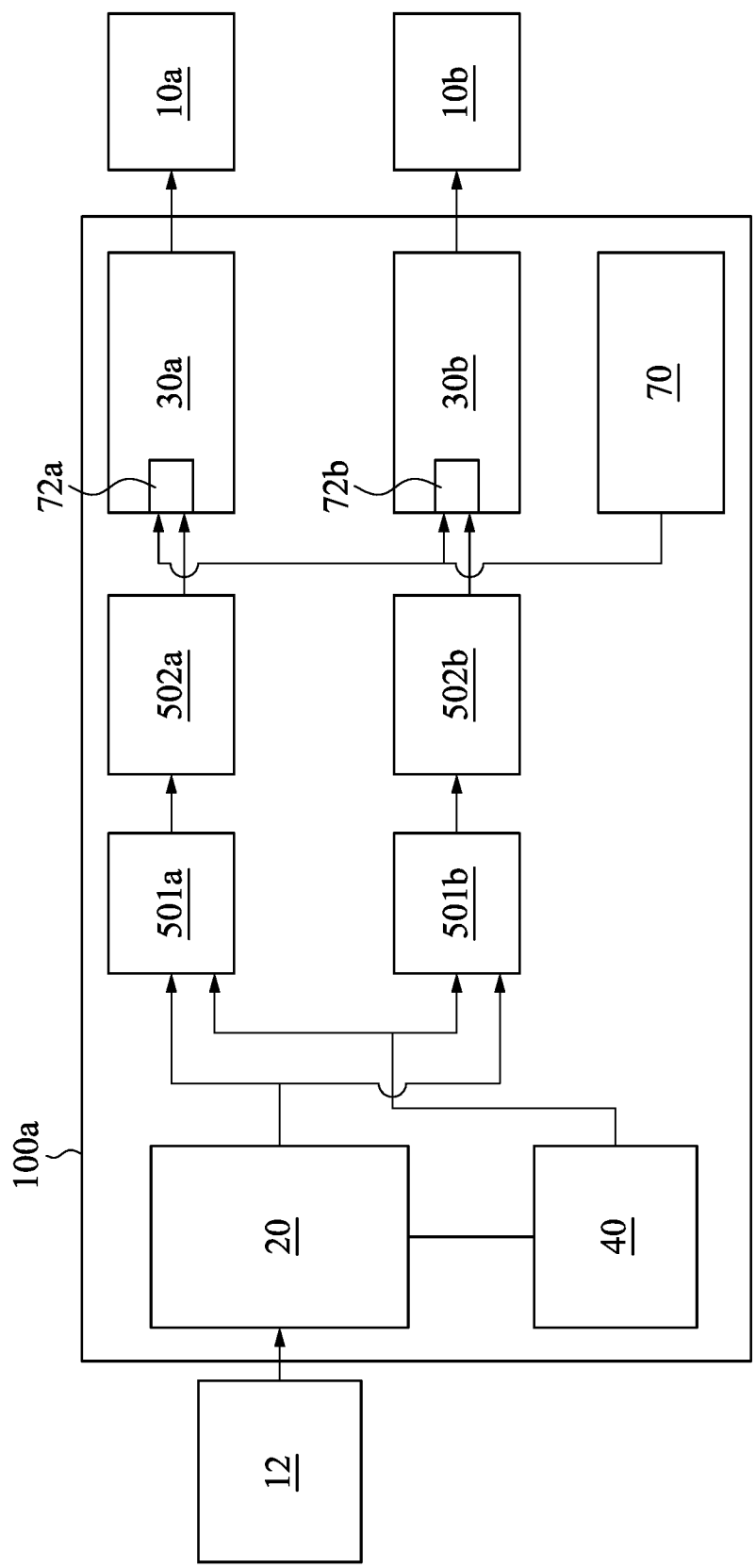
FIG. 3 is a schematic diagram of a HID switch with security function according to the embodiment of FIG. 2.

Referring to FIG. 3, FIG. 3 is a schematic diagram of a HID switch with security function according to the embodiment of FIG. 2. FIG. 3 is a detail diagram of the embodiment shown in FIG. 2. Referring to FIG. 3, one end of the HID host emulator 20 is a controller configured to electrically couple to the HID device 12. The HID device 12 may exchange bi-directional information with the HID host emulator 20. On the other end, the HID host emulator 20 is connected to the first HID isolation unit 50a and the second HID isolation unit 50b respectively. In the embodiment, the first HID isolation unit 50a includes a first addressing logic data latch 501a and a first data isolator 502a. In the same manner, the second HID isolation unit 50b includes a second addressing logic data latch 501b and a second data isolator 502b. The first data isolator 502a is electrically coupled to the first HID device emulator 30a, and the second data isolator 502b is electrically coupled to the second HID device emulator 30b. In the embodiment, the first HID device emulator 30a is electrically coupled to the first host computer 10a and the second HID device emulator 30b is electrically coupled to the second host computer 10b, as shown in FIG. 2. The first HID device emulator 30a and the second HID device emulator 30b are configured to exchange bi-directional information with the first host computer 10a and the second host computer 10b, respectively.

In this embodiment, the encryption and control unit 40 is electrically coupled to the HID host emulator 20, and coupled to the first addressing logic data latch unit 501a and the second addressing logic data latch unit 501b. The encryption unit 40 is utilized to control HID data encryption in HID host emulator 20, the first addressing logic data latch unit 501a and the second addressing logic data latch unit 501b. The encryption unit 40 is also utilized to control HID data decryption in the first HID device emulator 30a and the second HID device emulator 30b. When the HID host emulator 20 receives the HID data input from the HID device 12, the HID host emulator 20 may encrypt the HID data according to the command from the encryption unit 40, and may transform the encrypted HID data into the specific protocol. As shown in FIG. 3, there is an addressing input data unit 70 electrically coupled to the first HID device emulators 30a and the second HID device emulators 30b, respectively. The addressing input data unit 70 is configured to store addressing data into a first memory 72a and a second memory 72b, wherein the first memory 72a is configured in the first HID device emulator 30a and the second memory 72b is configured in the second HID device emulator 30b. Each the addressing data stored in the first memory 72a and the second memory 72b is a unique one. The encryption applied, by the HID host emulator 20, to the HID data is related to one of the addressing data. The encrypted HID data is broadcast to the first addressing logic data latch 501a and the second addressing logic data latch 250b. The first addressing logic data latch 501a and the second addressing logic data latch 250b are controlled by the encryption unit 40.

For example, when one of the first host computer 10a and the second host computer 10b is being selected to be connected to the HID device 12, the encryption unit 40 may enable the first addressing logic data latch 501a or the second addressing logic data latch 501b correspondingly. According to the command from the encryption unit 40, the HID host emulator 20 may encrypt the HID data with the addressing data stored in first memory 72a or second memory 72b. Even though both the first addressing logic data latches 501a and the second addressing logic data latches 501b receive the encrypted HID data, only the enabled addressing logic data latch may transmit the encrypted HID data to the first data isolator 502a or the second data isolator 502b. In order to prevent information leakage, the first data isolator 502a or the second data isolator 502b contains a unidirectional component (not shown), for example, optical-isolator, serial link, electromagnetic coupler, transformer or any other suitable circuitry that only enables data flows along a single direction. Accordingly, the encrypted HID data may only flow from the HID host emulator 20 to the first HID device emulator 30a or the second HID device emulator 30b. Then, one of the first HID device emulator 30a or the second HID device emulator 30b may receive the encrypted HID data. According to the addressing data stored in the first memory 72a or the second memory 72b, only one of the first HID device emulator 30a or the second HID device emulator 30b may decrypt the encrypted HID data correctly. The decrypted HID data may then be sent to the selected host computer, which may be the first host computer 10a or the second host computer 10b.

On the contrary, another addressing logic data latch does not enabled by the encryption 40 so that the HID device emulator connected to that addressing logic data latch may not receive the encrypted HID data. Therefore, the unselected host computer may not receive the HID data.

However, it should be understood that the aforementioned embodiment is only an exemplary embodiment, more than two host computers are available to be applied to the HID switch 100a. When more than two host computers are applied to the HID switch 100a, the number of the HID device emulators and the isolation units may be applied accordingly. The HID data from the HID device 12 may be broadcast to these isolation units, but only the one connected to the host computer enabled by the encryption 40 may correctly decrypt the HID data.

Figure 4A:
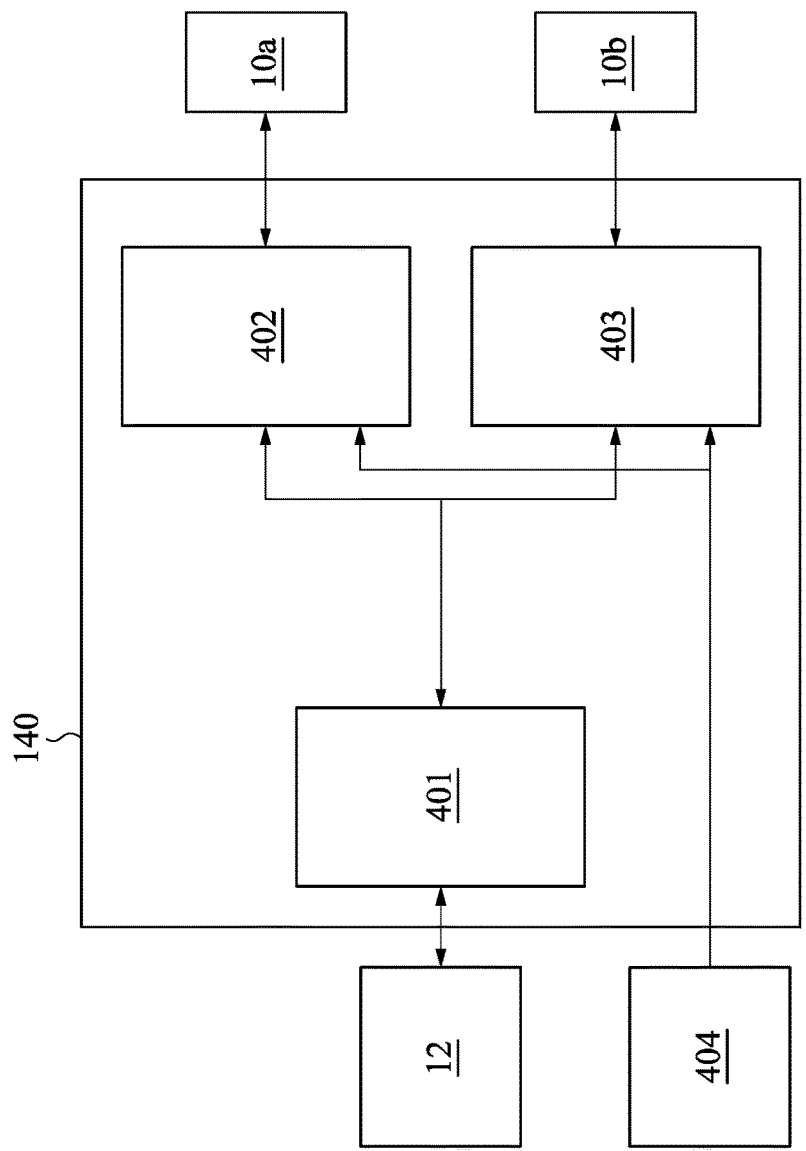
FIG. 4A is a schematic diagram of a HID switch with security function according to some embodiments of present disclosure.

FIG. 4A is a schematic diagram of a HID switch with security function according to some embodiments of present disclosure. As shown in FIG. 4A, a HID switch 140 comprises host emulator 401, first device emulator 402, and second device emulator 403. The host emulator 401 is a controller configured to electrically couple to a HID device 12, wherein the host emulator 401 is configured to input peripheral data from the HID device 12 via a bidirectional port, wherein the host emulator 401 may generate unidirectional serial output signals according to the peripheral data. The first device emulator 402 and the second device emulator 403 are physically isolated from one another. The first device emulator 402 is a configurable peripheral emulator, which is configured to electrically couple to a first host computer 10a. The second device emulator 402 is configured to receive information in the unidirectional serial output signals from the host emulator 401 and exchange bidirectional information with the first host computer 10a. The second device emulator 403 is also a configurable peripheral emulator, which is configured to electrically couple to a second host computer 10b. The second device emulator 403 is configured to receive information in the unidirectional serial output signals from the host emulator 401 and exchange bidirectional information with the second host computer 10b.

In the embodiment, an administrator device 404 is electrically couple to the HID switch 140 via a coupling port (not shown), wherein the administrator device 404 is electrically coupled to the first device emulator 402 and the second device emulator 403, respectively. The administrator device 404 is configured to provide a regulation to configure the first device emulator 402 and the second device emulator 403. The regulation limits that each of the first device emulator 402 and the second device emulator 403 is only allowed to receive signals from a single type of HID devices, respectively. The first device emulator 402 and the second device emulator 403 being configured may determine if it is allowable to receive the unidirectional serial output signals from the host emulator 401. If the unidirectional serial output signals are sent from a type of HID devices that the device emulator is allowed to receive, the device emulator receives the unidirectional serial output signals; otherwise, the device emulator cannot receive the unidirectional serial output signals.

Figure 4B:
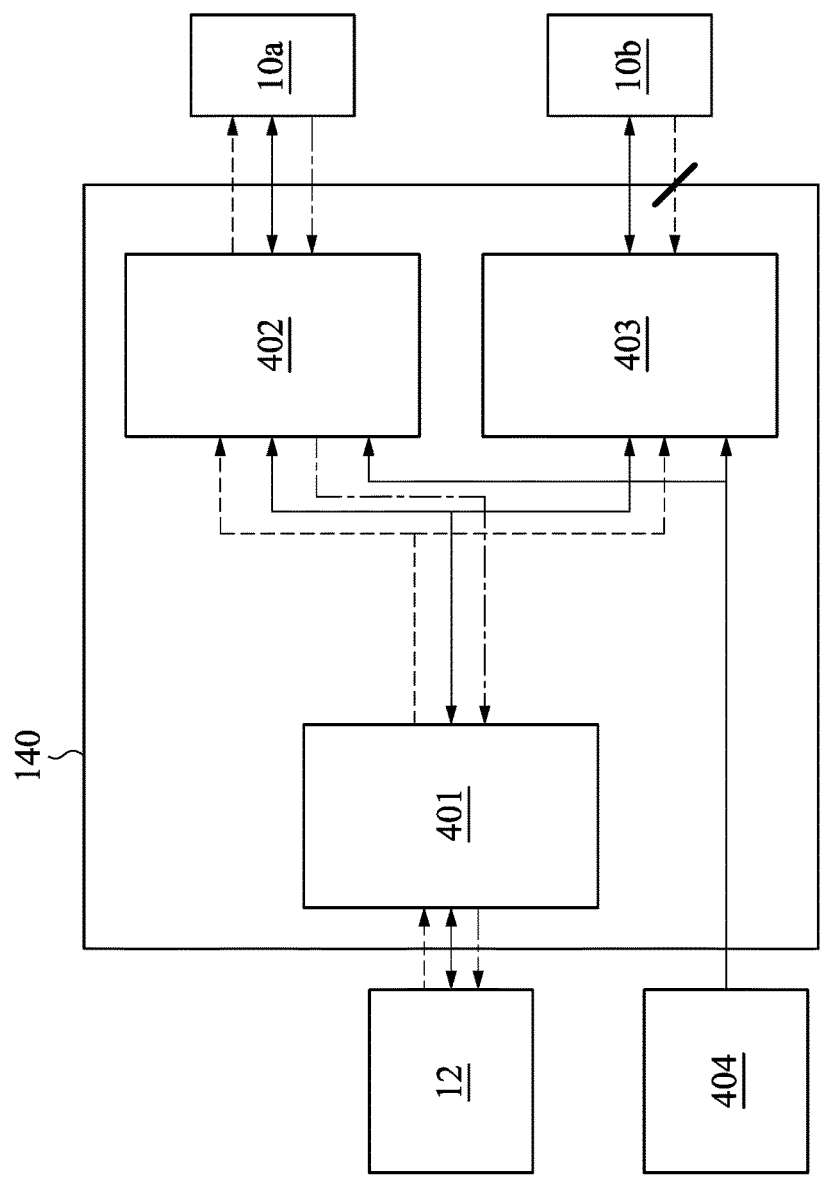
FIG. 4B is a schematic diagram of a HID switch with security function according to the embodiment of FIG. 4A.

FIG. 4B is a schematic diagram of a HID switch with security function according to the embodiment of FIG. 4A. For example, in the embodiment, after the regulation from the administrator device 404 is applied, the first device emulator 402 may only receive signals from keyboards and the second device emulator 403 may only receive signals from scanners.

As shown in FIG. 4A, in one embodiment, if the HID device 12 being coupled to the host emulator 401 is a keyboard, the host emulator 401 may generate unidirectional serial output signals according to the peripheral data sent from the HID device 12. The host emulator 401 then broadcast the unidirectional serial output signals to the first device emulator 402 and the second device emulator 403. Since the first device emulator 402 is being configured to only receive signals from keyboards, when the unidirectional serial output signals from the host emulator 401 is delivered, the first device emulator 402 receives the unidirectional serial output signals and send the unidirectional serial output signals to the first host computer 10a. However, since the second device emulator 403 is being configured to only receive signals from scanners, when the unidirectional serial output signals from the host emulator 401 is delivered, the second device emulator 403 is unable to receive the unidirectional serial output signals. Therefore, the unidirectional serial output signals will not be sent to the second host computer 10b. In the same manner, if the HID device 12 provided in the embodiment is a scanner, it would be the second device emulator 403 receives the unidirectional serial output signals instead of the first device emulator 402.

Figure 4C:
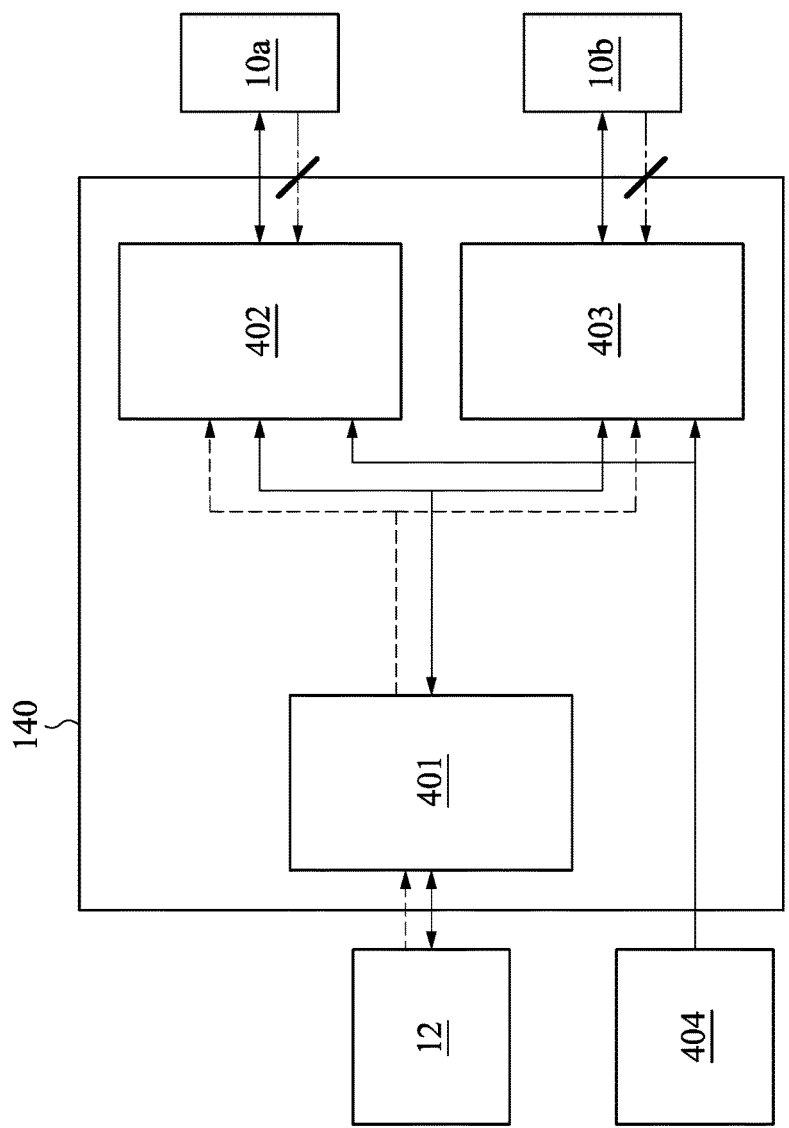
FIG. 4C is a schematic diagram of a HID switch with security function according to the embodiment of FIG. 4A.

FIG. 4C is a schematic diagram of a HID switch with security function according to the embodiment of FIG. 4A. As mentioned, after the regulation is applied, the first device emulator 402 may only receive signals from keyboards and the second device emulator 403 may only receive signals from scanners. As shown in FIG. 4C, in one embodiment, if the HID device 12 being coupled to the host emulator 401 is a mouse, the host emulator 401 may generate unidirectional serial output signals according to the peripheral data sent from the HID device 12. The host emulator 401 then broadcast the unidirectional serial output signals to the first device emulator 402 and the second device emulator 403. However, since the first device emulator 402 may only receive signals from keyboards and the second device emulator 403 may only receive signals from scanners, when the unidirectional serial output signals is delivered to the first device emulator 402 and the second device emulator 403, none of them may receive the unidirectional serial output signals from the host emulator 401.

However, it should be understood that the limitations to the first device emulator 402 and the second device emulator 403 are not permanent. Once the administrator device 404 is electrically the first device emulator 402 and the second device emulator 403, it may provide new regulation to reconfigure the first device emulator 402 and the second device emulator 403. After the new regulation is applied, the first device emulator 402 and the second device emulator 403 may receive signals from different type of HID devices; however, signals from a single type of HID devices may still be received by one device emulator.

Moreover, in some embodiments, the regulation is provide to limit that the first device emulator 402 and the second device emulator 403 may only receive signals from a single device. For example, if the first device emulator 402 is being regulated to receive a specific keyboard, signals from other keyboards may not be received by the first device emulator 402. The approach may be established by authenticating signals from a specific HID device through its PID (Product ID) or VID (Vendor ID). Each of the device emulators is being configured to receive signals only from a specific HID device with a unique PID. If the signals are sent from HID devices with other PIDs, the device emulator is unable to receive the signals.

Figure 5A:
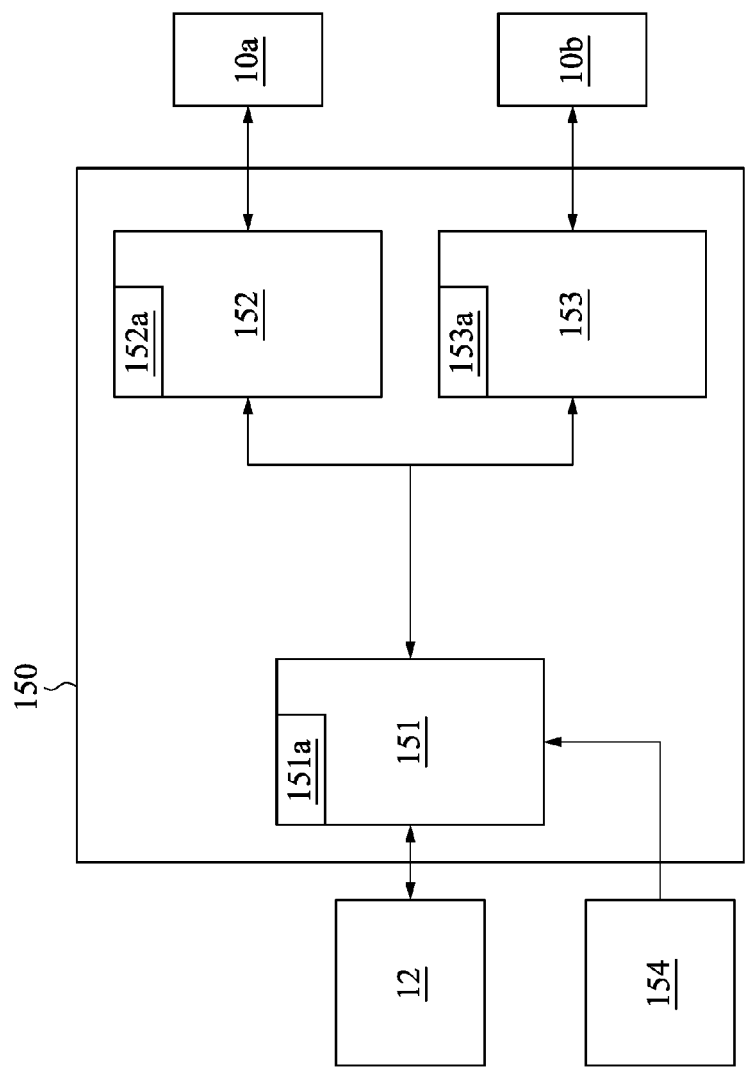
FIG. 5A is a schematic diagram of a HID switch with security function according to some embodiments of present disclosure.

FIG. 5A is a schematic diagram of a HID switch with security function according to some embodiments of present disclosure. As shown in FIG. 5A, a HID switch 150 comprises host emulator 151, first device emulator 152, and second device emulator 153. The host emulator 151 is a controller configured to electrically couple to a HID device 12, wherein the host emulator 151 is configured to input peripheral data from the HID device 12 via a bidirectional port, wherein the host emulator 151 may generate unidirectional serial output signals according to the peripheral data. The first device emulator 152 is a configurable peripheral emulator, which is configured to electrically couple to a first host computer 10a. The first device emulator 152 is configured to receive information in the unidirectional serial output signals from the host emulator 151 and exchange bidirectional information with the first host computer 10a. The second device emulator 153 is also a configurable peripheral emulator, which is configured to electrically couple to a second host computer 10b. The second device emulator 153 is configured to receive information in the unidirectional serial output signals from the host emulator 151 and exchange bidirectional information with the second host computer 10b.

In the embodiment, an administrator device 154 is electrically couple to the HID switch 150 via a coupling port (not shown), wherein the administrator device 154 is electrically coupled to the host emulator 151. The administrator device 154 is configured to provide a regulation to configure the host emulator 151, the first device emulator 152, and the second device emulator 153. The regulation limits that each of the host emulator 151, the first device emulator 152 and the second device emulator 153 to pass signals with additional address information. Particularly, after the regulation is applied, when the host emulator 151, the first device emulator 152, or the second device emulator 153 passes signals, it has to add address information into the signals to indicate the destination of the signals. The host emulator 151, the first device emulator 152 and the second device emulator 153 are allowed to receive signals only when the correct addresses are directed. In the embodiment, the address information may be determined by the type of the HID device 12.

Figure 5B:
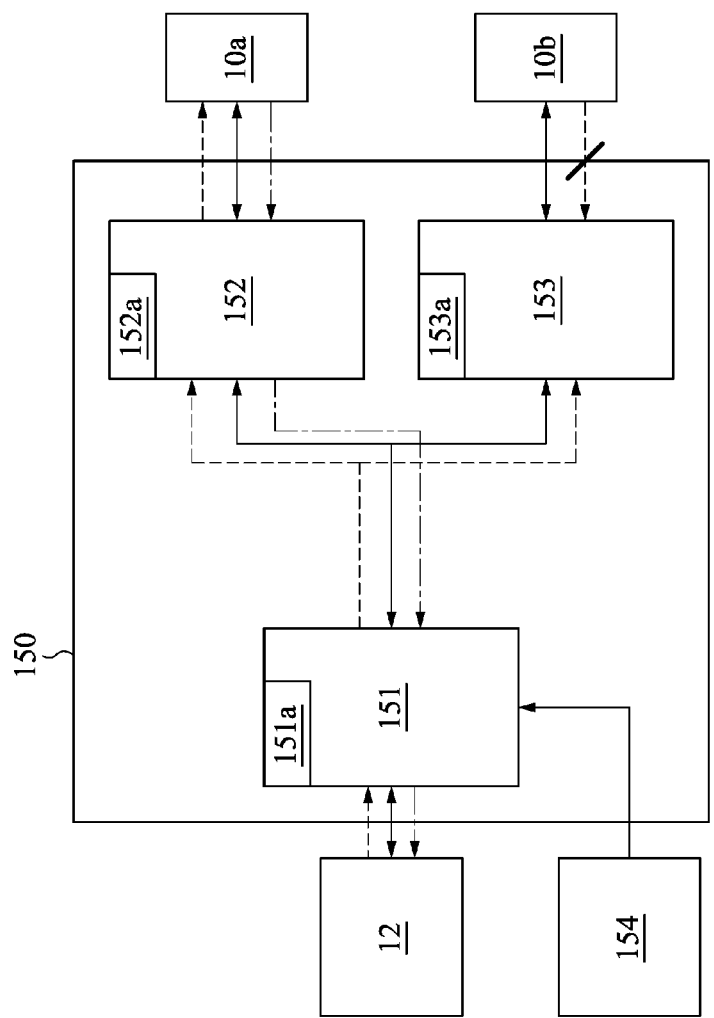
FIG. 5B is a schematic diagram of a HID switch with security function according to the embodiment of FIG. 5A.

FIG. 5B is a schematic diagram of a HID switch with security function according to the embodiment of FIG. 5A. In the embodiment, the host emulator 151 is assigned with a first address 151a, the first device emulator 152 is assigned with a second address 152a, and the second device emulator 153 is assigned with a third address 153a. It is to say, after the regulation from the administrator device 154 is applied, the host emulator 151, the first device emulator 152 and the second device emulator 153 may add address information to the signals passed by them. However, the address information being added to the signals passed these emulators are determined according to the type of the HID device 12. For example, in the embodiment, if the HID device 12 is a keyboard, the address information signals being added to the signals would be directed to the second address 152a. And if the HID device 12 is a scanner, the address information signals being added to the signals would be directed to the third address 153a.

In the embodiment, the host emulator 151 is configured to receive peripheral data from the HID device 12 and generate unidirectional serial output signals according to the peripheral data. According to the regulation, before the host emulator 151 passes the unidirectional serial output signals to the first device emulator 152 and the second device emulator 153. If the HID device 12 is a keyboard, the address information corresponding to the second address 152a would be added to the unidirectional serial output signals. When the unidirectional serial output signals are broadcasted to the first device emulator 152 and the second device emulator 153, the first device emulator 152 and the second device emulator 153 may authenticate the address information in the unidirectional serial output signals. Since the address information is directed to the second address 152a, only the first device emulator 152 may receive the unidirectional serial output signals, the second device emulator 153 assigned with the third address 153a may not. Through the first device emulator 152, the unidirectional serial output signals may be sent to the 10a.

Moreover, in the embodiment, the first device emulator 152 may receive signals from the first host computer 10a as well. When the signals from the first host computer 10a is passed to the first device emulator 152, the first device emulator 152 may add an address information corresponding to the first address 151a to the signals. Since the first address is directed to the host emulator 151, only the host emulator 151 may receive the signals from the first host computer 10a and passes the signals to the HID device 12. It is to say, signals sent from the first host computer 10a would only be directed to the host emulator 151, the second device emulator 153 is unable to receive them.

Figure 5C:
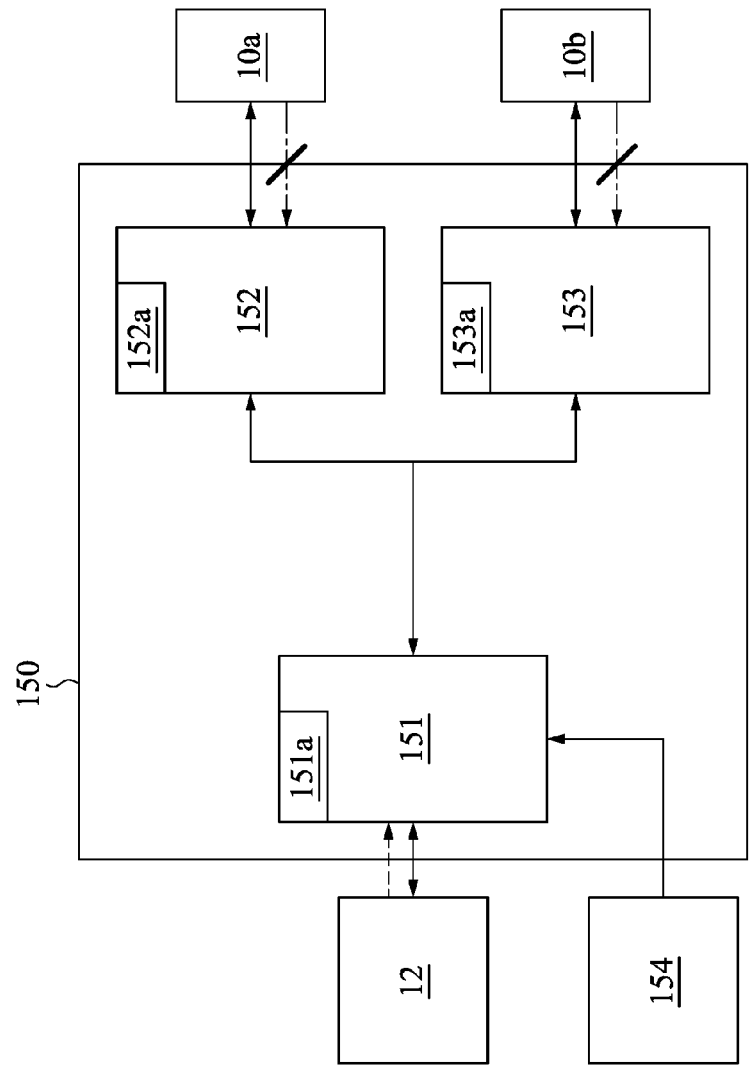
FIG. 5C is a schematic diagram of a HID switch with security function according to the embodiment of FIG. 5B.

FIG. 5C is a schematic diagram of a HID switch with security function according to the embodiment of FIG. 5B. In the embodiment, the host emulator 151 is assigned with the first address 151a, the first device emulator 152 is assigned with the second address 152a, and the second device emulator 153 is assigned with the third address 153a. However, the HID device 12 coupled to the host emulator 151 is no longer a keyboard but a mouse. As mentioned in the embodiment of FIG. 5B, signals sent from the keyboard devices would be added with address information directing to the second address 152a, and signals sent from the scanner devices would be added with address information directing to the third address 153a. However, the HID device 12 coupled to the host emulator 151 is a mouse, and the HID device 12 of this type does not ruled by the regulation. When the host emulator 151 receives peripheral data from the HID device 12 and generate unidirectional serial output signals accordingly, the host emulator 151 may not add address information to the unidirectional serial output signals. Apparently, the unidirectional serial output signals without address information would not be received by any device emulators. Since the unidirectional serial output signals without address information may not be delivered to the first host computer 10a and the second host computer 10b, feedback signals from these host computers would not be generated as well.

However, the limitations to the first device emulator 152 and the second device emulator 153 are not permanent. Once the administrator device 154 is electrically the host emulator 151, it may provide new regulation to reconfigure the first device emulator 152 and the second device emulator 153. After the new regulation is applied, the first device emulator 152 and the second device emulator 153 may receive signals from different type of HID devices.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A HID switch with security function that permits sharing of peripherals between multiple computers in a multi-network computer system comprising:
   an interface configured to connect to a user input peripheral device;
   a first peripheral emulator and a second peripheral emulator, both configured to connect to a first host computer and a second host computer, respectively, wherein the first and second host computer are capable of being connected to at least two separate networks, respectively, wherein the first peripheral emulator comprises a first memory stored with first addressing data, and the second peripheral emulator comprises a second memory stored with second addressing data, wherein the first addressing data is different from the second addressing data;
   a controller connected to the user input peripheral device through the interface, to input peripheral data via a bidirectional port and generate unidirectional serial signals according to the peripheral data;
   a first addressing logic data latch and a second addressing logic data latch, both connected to the controller, to receive the unidirectional serial signals broadcasted from the controller;
   an encryption unit connected to the controller, the first addressing logic data latch and the second addressing logic data latch, wherein the encryption unit provide an encryption command to the controller so that the controller encrypts the unidirectional serial signals according to the encryption command, wherein the encryption command includes one of the first addressing data or the second addressing data at a time, wherein the encryption unit controls the first addressing logic data latch and the second addressing logic data latch;
   a first physical unidirectional enforcing circuit connected between the first addressing logic data latch and the first peripheral emulator, enforcing unidirectional data flow only from the first addressing logic data latch to the first peripheral emulator;
   a second physical unidirectional enforcing circuit connected between the second addressing logic data latch and the second peripheral emulator, enforcing unidirectional data flow only from the second addressing logic data latch to the second peripheral emulator; and
   wherein the first and second peripheral emulators are electrically isolated from one another, wherein when the first peripheral emulator receives the unidirectional serial signals from the controller, the first peripheral emulator decrypts the unidirectional serial signals according to the first addressing data and sends the unidirectional serial signals to the first host computer, and wherein when the second peripheral emulator receives the unidirectional serial signals from the controller, the second peripheral emulator decrypts the unidirectional serial signal according to the second addressing data and sends the unidirectional serial signals to the second host computer.

2. The HID switch of claim 1, wherein each of the first and second physical unidirectional enforcing circuit includes an optical isolator, wherein the optical isolator enforces the unidirectional data flows.

3. A HID switch with security function that permits sharing of peripherals between multiple computers in a multi-network computer system comprising:
   a first interface configured to connect to a user peripheral device;
   a second interface configured to connect to an administrator device;
   a controller connected to the user peripheral device through the first interface, wherein the controller is configured to input peripheral data via a bidirectional port and generate unidirectional serial signals according to the peripheral data, and wherein the controller is connected to the administrator device through the second interface, wherein the administrator device provides a regulation to limit the controller to add address information to the unidirectional serial signals; and
   a first peripheral emulator and a second peripheral emulator, both configured to connect to a first host computer and a second host computer, respectively, wherein the first and second host computer are capable of being connected to at least two separate networks, respectively, and wherein the first and second peripheral emulators receive information in the unidirectional serial signals and exchange bidirectional information with the first and second host computers, wherein each of the first and second peripheral emulators is routed by a unique address, respectively;

wherein the first and second peripheral emulators are physically isolated from one another, wherein when the first peripheral emulator or the second peripheral emulator receives the unidirectional serial signals, the first peripheral emulator or the second peripheral emulator determines whether to receive the unidirectional serial signals by comparing the address information with the unique address.

* * * * *